US007899403B2

(12) United States Patent
Aaron

(10) Patent No.: US 7,899,403 B2
(45) Date of Patent: Mar. 1, 2011

(54) METHODS, SYSTEMS, AND COMPUTER-READABLE MEDIA FOR MEASURING SERVICE QUALITY VIA MOBILE HANDSETS

(75) Inventor: Jeffrey Aaron, Atlanta, GA (US)

(73) Assignee: AT&T Intellectual Property I, LP, Reno, NV (US)

( * ) Notice: Subject to any disclaimer, the term of this patent is extended or adjusted under 35 U.S.C. 154(b) by 853 days.

(21) Appl. No.: 11/810,753

(22) Filed: Jun. 7, 2007

(65) Prior Publication Data

US 2008/0305747 A1   Dec. 11, 2008

(51) Int. Cl.
*H04B 17/00* (2006.01)
(52) U.S. Cl. .................. 455/67.11; 455/404.2; 455/405; 455/440; 455/456.1
(58) Field of Classification Search .............. 455/404.2, 455/405, 440, 456.1, 67.11, 407, 422.1, 423, 455/425, 452.2
See application file for complete search history.

(56) References Cited

U.S. PATENT DOCUMENTS

2003/0236087 A1 * 12/2003 Stenton ...................... 455/418
2004/0176040 A1 *  9/2004 Thornton et al. ......... 455/67.11

* cited by examiner

*Primary Examiner*—Tuan A Pham
(74) *Attorney, Agent, or Firm*—Myers Bigel Sibley & Sajovec, P.A.

(57) ABSTRACT

Methods, systems and computer-readable media are provided for measuring service quality of wireless communications systems, including automatically detecting, reporting and assessing problems in wireless communications systems. The location measurement capability of a wireless terminal is leveraged to note the position of the wireless terminal when measuring service quality and when service problems are encountered. Descriptive information associated with a service quality is collected and stored and subsequently transmitted to a central processor at a later time along with location information. This information enables service quality maps to be constructed and continuously updated without negatively impacting a wireless communications system. A user of a wireless terminal may be provided the opportunity to provide feedback that is subsequently transmitted to the central processor and used in analyzing and rectifying problems.

12 Claims, 4 Drawing Sheets

METHODS, SYSTEMS, AND COMPUTER-READABLE MEDIA FOR MEASURING SERVICE QUALITY VIA MOBILE HANDSETS

FIELD OF THE INVENTION

The present invention relates generally to communication networks and, more particularly, to measuring service quality in wireless communications networks.

BACKGROUND OF THE INVENTION

Wireless telecommunications networks (e.g., cell phone networks) typically require periodic reassessment in terms of their coverage and service quality. Areas of poor coverage, if not outright gaps, can appear due to environmental changes (e.g., new building construction, new metallic objects such as fences, etc.), changes in competitors' networks (e.g., the addition of a new tower, new antenna, new frequency usage, or slight change in an existing antenna direction), various types and degrees of malfunctions or equipment degradations, and/or interference caused by a variety of electromagnetic energy sources (e.g., leakage from transmitters/receivers or other broadcasters, ham radios, malfunctioning electrical equipment such as failing industrial motors, etc.). Providers of wireless telecommunications may spend considerable amounts of money and manpower conducting measurement/coverage checks throughout their service areas which may involve service technicians driving around a service area making manual quality of service measurements. This approach is not only expensive and labor intensive, but also unsophisticated and inefficient. As new applications and services are introduced into wireless networks, the need for better service quality measurements will likely increase. As such, a need exists for improved ways of monitoring service quality in wireless telecommunications networks.

SUMMARY

Embodiments of the present invention leverage the location measurement capability of a wireless terminal to automatically identify the position of the wireless terminal when service problems are encountered. Embodiments of the present invention allow descriptive information associated with a problem to be collected, stored and subsequently transmitted to a central processor with location information. This information enables service quality maps to be constructed and continuously updated. Moreover, users of wireless terminals are given the opportunity to provide comments and feedback that is subsequently transmitted to a central processor and used in analyzing and rectifying problems.

According to some embodiments of the present invention, a method of monitoring quality-of-service performance of a wireless communications system, includes the following steps performed by a wireless terminal: measuring quality of a wireless communication service; determining a geographical location of the wireless terminal in response to measuring quality of the wireless communication service; and storing the measured service quality information and location information for subsequent transmission to a central processor in the wireless communication system. Monitoring may occur periodically or continuously. According to some embodiments of the present invention, monitoring may occur when a user accesses a particular application or service.

According to some embodiments of the present invention, a method of monitoring quality-of-service performance of a wireless communications system, includes the following steps performed by a wireless terminal: monitoring quality-of-service performance of a wireless communication service; detecting a change in quality of a wireless communication service; determining a geographical location of the wireless terminal in response to detecting a change in service quality of a wireless communication service; and storing the detected service quality change information and location information for subsequent transmission to a central processor in the wireless communication system. Monitoring may occur periodically or continuously. According to some embodiments of the present invention, monitoring may occur when a user accesses a particular application or service.

Changes in service quality may include performance parameters that fall below threshold values such as, for example, signal strength of a radio link with a base station, signal quality of a radio link with a base station, and/or numbers of dropped calls, etc. Geographical location of a wireless terminal may be determined, for example, via a Global Positioning System (GPS) receiver in the wireless terminal, via triangulation methods using measurements from multiple base stations, or by determining a geographical location of a base station with which the wireless terminal has a radio link.

According to some embodiments of the present invention, a wireless terminal may be configured to collect and store additional information about the user and/or the wireless terminal. Moreover, a wireless terminal may be configured to collect and store user feedback regarding a performance parameter that falls below a threshold value and/or other service problem(s) and/or related user perceptions and opinions. According to some embodiments of the present invention, a wireless terminal may be configured to provide user access to a web log ("blog") to allow the user to provide feedback/concerns about a wireless service or other aspect of a wireless communications system to a wireless communications system service provider.

According to some embodiments of the present invention, a wireless terminal is configured to transmit collected and stored information to a central processor in a wireless communications system. Transmission to the central processor may occur according to a predetermined schedule (e.g., hourly, daily, etc.) and/or at times when traffic on the wireless communications system is low and/or at times when transmission is otherwise convenient. Transmission may also occur based upon an interval since a previous transmission.

According to some embodiments of the present invention, methods of assessing quality-of-service performance of a wireless communications system include the following operations performed by a central processor in a wireless communications system: receiving wireless communication service performance quality information and geographic location information from a respective plurality of wireless terminals; and updating a quality-of-service map for the wireless communications system with the received information. According to some embodiments of the present invention, user feedback information is also received by the central processor and is used in updating quality-of-service maps. Updating may include various types and amounts of processing as may be needed. According to embodiments of the present invention, updated quality-of-service map(s) are analyzed and one or more problems with the wireless communications system that require attention are identified.

According to some embodiments of the present invention, a wireless communications system includes a plurality of base stations, and a plurality of wireless terminals, wherein each wireless terminal is configured to communicate via a radio link with a base station. One or more of the wireless terminals are configured to detect a change in service quality, determine a geographical location of the wireless terminal in response to detecting a change in service quality, and store detected service quality change information and location information for subsequent transmission to a central processor in the wireless communication system. A central processor is configured to receive wireless communication service performance change information and geographic location information from the wireless terminals, as well as various types of user feedback, and to update quality-of-service map(s) for the wireless communications system with the received information.

According to some embodiments of the present invention, a computer-readable medium includes instructions for monitoring quality-of-service performance of a wireless communication service, detecting a change in quality of a wireless communication service, determining a geographical location of a wireless terminal in response to detecting a change in quality of a wireless communication service, and storing the detected service quality change information and location information for subsequent transmission to a central processor in the wireless communication system. The computer-readable medium may further include instructions for transmitting stored service quality change information and location information to the central processor. The computer-readable medium may further include instructions for collecting user feedback regarding a change in service quality, and for storing the collected user feedback with the stored service quality change information and location information.

Other methods, systems and/or computer-readable media according to embodiments of the invention will be or become apparent to one with skill in the art upon review of the following drawings and detailed description. It is intended that all such additional methods, systems, and/or computer program products be included within this description, be within the scope of the present invention, and be protected by the accompanying claims.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION

Figure 1:
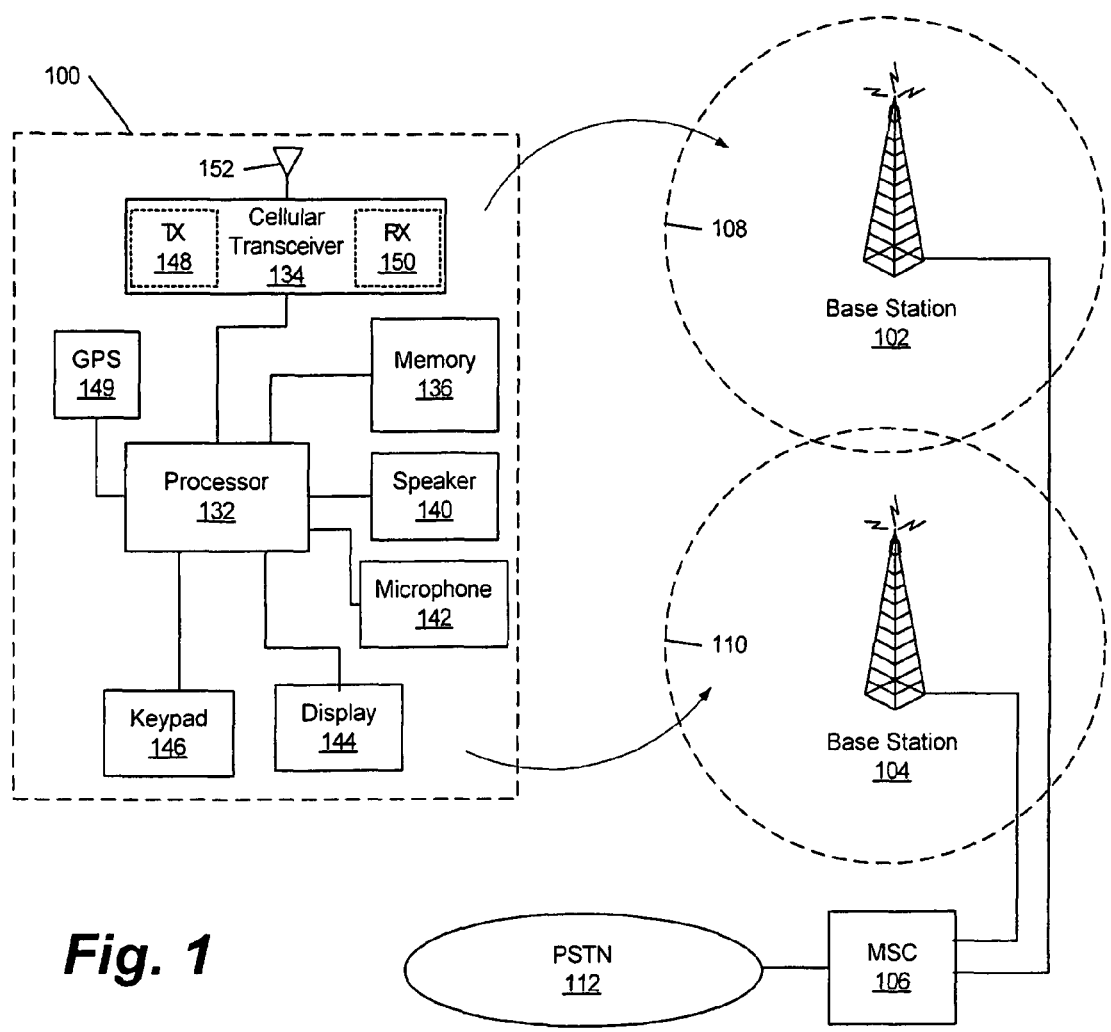
FIG. 1 is a block diagram of a wireless communications system in which embodiments of the present invention may be implemented, according to some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification are taken to specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "quality-of service map" is intended to include all types of maps and similar depictions relating to a wireless communications system including, but not limited to, signal coverage maps, signal strength maps, and the like. Also, as used herein, "feedback" is intended to include all types of comments, opinions and/or perceptions, responses, suggestions, selected choices, ratings, etc. such as may be useful in the context of wireless communications network service quality.

The present invention may be embodied as methods, apparatus/systems, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

The present invention is described herein with reference to flowchart and/or block diagram illustrations of methods, apparatus/systems, and computer program products in accordance with exemplary embodiments of the invention. These flowchart and/or block diagrams further illustrate exemplary operations for monitoring quality of service performance of a wireless communications system, in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a wireless terminal (i.e., cellular telephone), general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a wireless terminal, computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a wireless terminal, computer or other programmable data processing apparatus to cause a series of operational steps to be performed on the wireless terminal, computer or other programmable apparatus to produce a computer implemented process such that the instructions that execute on the wireless terminal, computer or other programmable apparatus provide steps for implementing the functions specified in the flowchart and/or block diagram block or blocks.

FIG. 1 is a functional block diagram of an exemplary wireless communications system in which embodiments of the present invention may be implemented. The illustrated wireless communications system includes a plurality of base stations 102 and 104 that are connected to one or more mobile services switching centers (MSC) 106. Each of the base stations 102 and 104 is located in, and provides services to, a geographic region referred to as a cell, 108 and 110, respectively. In general, there is one base station for each cell. As is well known in the art, cells in practice may sometimes be divided into sectors, for instance based on the use of multiple co-located directional antennas each of which points in a different direction and so defines one sector of the cell, but for the sake of simplicity sectors are not discussed herein and the terms "cell" and "sector" may generally be treated the same. Within each cell, there may be a plurality of wireless terminals (e.g., cell phones) 100 that communicate via radio link with a base station that services the cell in a manner well known in the art. The base stations 102 and 104 allow a user of a wireless terminal 100 to communicate with other wireless terminals 100, or with users connected to a Public Switched Telephone Network (PSTN) 112. The MSC 106 routes calls to and from a wireless terminal 100 through one of the base stations 102 and 104 that, for example, provides the strongest communication link to the wireless terminal 100. Information concerning the cell location and activity status of the wireless terminal 100 is stored in a Home Location Register (not shown) and a Visitor Location Register (not shown), which may be incorporated into, or otherwise communicate with, the MSC 106. Although only two cells 108 and 110 are shown for illustration purposes, a typical cellular communications system within whish embodiments of the present invention may be implemented may include hundreds of cells and may service thousands of wireless terminals 100.

An exemplary wireless terminal 100 in which embodiments of the present invention may be implemented includes a processor 132, a transceiver 134, a memory 136 and may also include a speaker 140, a microphone 142, a display 144, a keypad 146, and a GPS receiver 149. The memory 136 may include one or more erasable programmable read-only memories (EPROM or Flash EPROM), battery backed random access memory (RAM), magnetic, optical, or other digital storage device, and may be separate from, or at least partially within, the processor 132. The processor 132 may include more than one processing component, such as, for example, a general purpose processor and a digital signal processor, which may be enclosed in a common package or separate and apart from one another. The transceiver 134 typically includes both a transmitter 148 and a receiver 150 to allow two way communications, but the present invention is not limited to such devices and, as used herein, a "transceiver" may include only the receiver 150 or a "transceiver" may include only the transmitter 148. The wireless terminal 100 may communicate with the base stations 102 and 104 using radio frequency signals, which may be communicated through an antenna 152 over one or more communication channels according to one or more cellular communication protocols.

Figure 2:
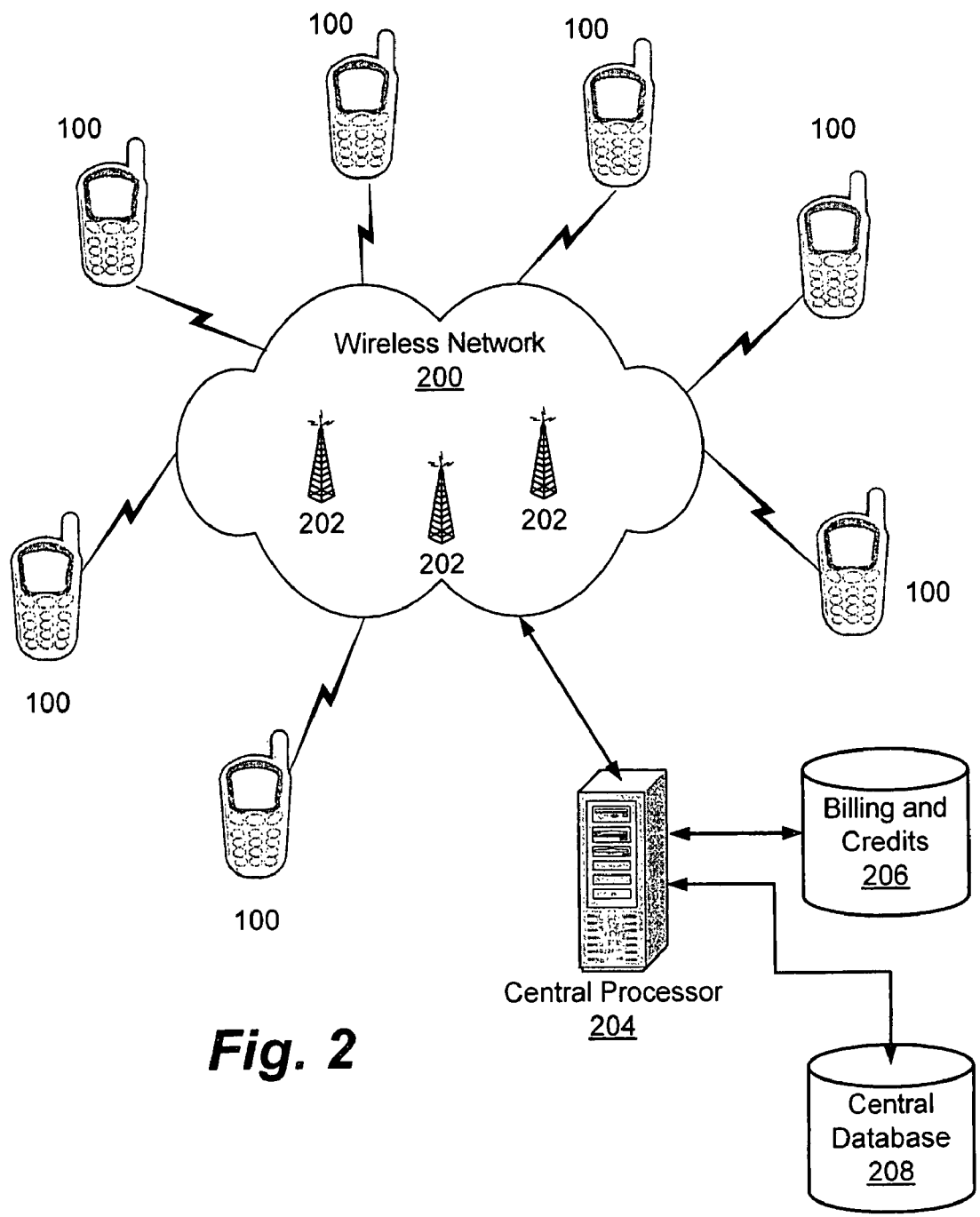
FIG. 2 is a block diagram of a wireless communications system, according to some embodiments of the present invention, wherein a plurality of wireless terminals are configured to measure service quality, to determine geographical location information, and subsequently transmit this information to a central processor.

Referring now to FIG. 2, a wireless communications system 200, according to embodiments of the present invention, includes a plurality of base stations 202 and a plurality of wireless terminals 100 that are configured to monitor and report quality-of-service performance information. The term "wireless communication services" includes, but is not limited to, cellular telephone service and applications accessible via a wireless communications system, such as, for example, video service, audio service, email service, text messaging, multimedia messaging, videoconferencing, gaming, Internet service, various types of location-based services, data delivery, etc.

It is not required that all of the wireless terminals in a wireless communications system be capable of monitoring and reporting quality-of-service performance information, according to embodiments of the present invention. For example, older wireless terminals in a wireless communications system implementing embodiments of the present invention may not be configured to monitor and report quality-of-service performance information. However, as the number of wireless terminals participating in quality-of-service performance monitoring and reporting increases, the accuracy and effectiveness of problem identification and rectification may increase.

One or more of the wireless terminals 100, and preferably a large number of the wireless terminals 100, are configured to measure quality of a wireless communication service, and then determine, if not already known, a geographical location (i.e., determine where the respective wireless terminal is located). The measurement of service quality may occur when a problem is known to exist and/or when no problem is known to exist. For example, knowing that service quality has not deteriorated is useful information for updating coverage maps, i.e., being assured that coverage maps are up-to-date and still accurate. In addition, quality service problems may not manifest themselves in parameter changes immediately. Some service quality problems may take time to appear in various parameters.

A specific embodiment is described hereinafter wherein a wireless terminal 100 measures service quality when a change in quality of a wireless communication service is detected. However, it is understood that embodiments of the present invention are not limited to only measuring service quality when performance parameter changes are detected. As described above, wireless terminals 100 may also be configured to measure quality of service even when no problems are known to exist and when no changes in service parameters are detected.

In some embodiments, measurement may occur when a change in a performance parameter is detected. For example, one or more of the wireless terminals 100, and preferably a large number of the wireless terminals 100, are configured to detect a change in quality of a wireless communication service (e.g., a wireless terminal 100 may detect a performance parameter that falls below a threshold value, etc.), and then determine, if not already known, a geographical location (i.e., determine where the respective wireless terminal is located) in response to detecting a change in quality of a wireless communication service. Threshold values that are monitored may change over time or as a function of a wireless service. Performance parameter threshold values need not be fixed.

Each wireless terminal 100 implementing embodiments of the present invention stores the detected performance parameter information and location information for subsequent transmission to a central processor 204 in the wireless communications system. A wireless terminal 100 implementing embodiments of the present invention may also be configured to collect user feedback regarding a performance parameter that falls below a threshold value or about another problem(s) associated with a wireless communications service, and then store the collected user feedback for subsequent transmission to a central processor 204.

As such, wireless terminals 100, according to embodiments of the present invention, can measure service problems in real time during use, which can improve accuracy of problem identification. Moreover, geographical location can be automatically detected and associated with each detection of a change in service quality. In addition, a wireless terminal 100 may already know its geographic location due to periodic GPS updates, triangulation using multiple base stations and/or other signal sources, and/or other applications that are running. Service quality information, location information, and other associated data are stored and later transmitted to a central processor 204 using the wireless communications network itself, for example, when coverage and traffic level permit such transmission. Although users are afforded the opportunity to provide feedback during a problem, they are not required to do so.

The central processor 204 is configured to receive service performance information, geographic location information, and user feedback from the various wireless terminals 100, for example, on a periodic basis. The central processor 204 is configured to update a quality-of-service map for the wireless communications system with the received information. Technicians can then consult the updated quality-of-service map and determine if problems or changes warrant any adjustment to the wireless communications network or its components, and/or to various services or applications. The central processor 204 may be implemented by one or more devices within the wireless network 200. The central processor 204 may even be distributed to some degree. If multiple devices are used to implement the central processor 204, they need not be collocated (i.e., in the same geographic location). The functions of the central processor 204 may be implemented in various ways without limitation.

The illustrated central processor 204 is in communication with a billing and credits database 206 and a central database 208. As described below, according to some embodiments of the present invention, users who provide feedback may be rewarded in various ways. For example a wireless communications system service provider may provide credits to a user's service bill in response to the user providing feedback regarding a service performance issue. The central database 208 may be utilized to store information received from wireless terminals. The central database 208, in conjunction with the central processor 204, may be utilized to draw and/or analyze quality-of-service maps as described below.

Figure 3:
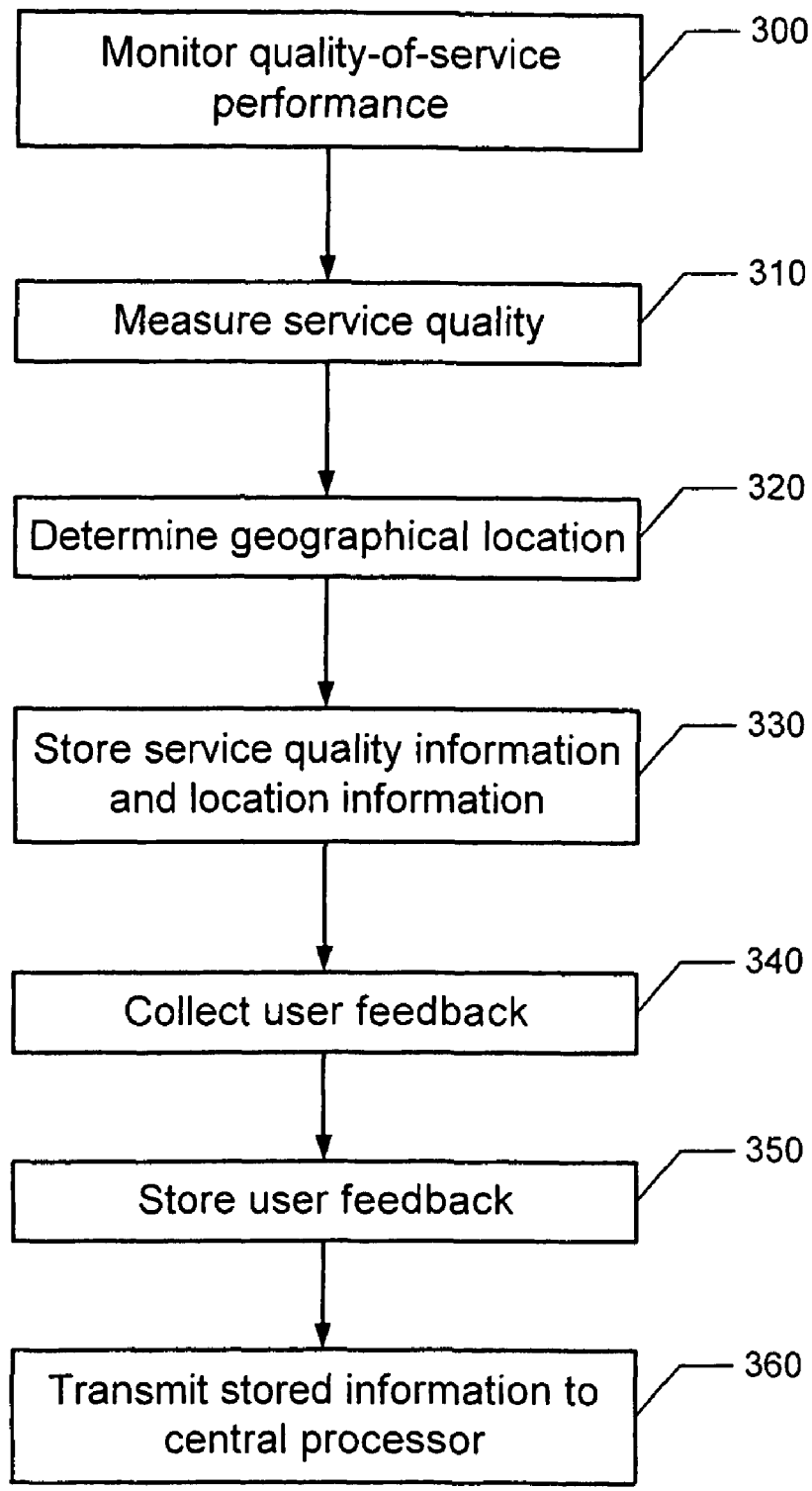
FIG. 3 is a flow chart that illustrates exemplary operations performed by a wireless terminal, according to embodiments of the present invention.

Referring to FIG. 3 operations performed by a wireless terminal 100 implementing embodiments of the present invention are illustrated. The operations of FIG. 3 are implemented via software (including firmware, resident software, micro-code, etc.) executing on a wireless terminal 100. Computer program code for carrying out the operations of FIG. 3 may be written in a high-level programming language, such as Java, AJAX (Asynchronous JavaScript), C, and/or C++, for development convenience. In addition, computer program code for carrying out operations of FIG. 3 may also be written in other programming languages, such as, but not limited to, interpreted languages. Some modules or routines may be written in assembly language or even micro-code to enhance performance and/or memory usage. However, embodiments of the present invention are not limited to a particular programming language. It will be further appreciated that the functionality of any or all of the operations in FIG. 3 may also be implemented by a wireless terminal 100 using discrete hardware components, one or more application specific integrated circuits (ASICs), or a programmed digital signal processor or microcontroller.

It should be noted that in some embodiments of the present invention, the function(s) noted in the blocks of FIG. 3 may occur out of the illustrated order. For example, two blocks shown in succession may, in fact, be executed substantially concurrently or the blocks may sometimes be executed in the reverse order, depending on the functionality involved.

A wireless terminal 100, according to embodiments of the present invention, monitors quality-of-service performance of a wireless communications service and/or application (Block 300). The wireless terminal 100 may monitor on a continuous basis or on a periodic basis. According to some embodiments of the present invention, a wireless terminal 100 may monitor when a user attempts to access a service or application (e.g., voice, video, image, text, instant messaging, multimedia messaging, video conferencing, gaming, Internet service, various types of location-based services, data delivery, etc.) via the wireless communications system.

The wireless terminal 100 measures service quality (Block 310) which may include detecting changes in service quality e.g., changes in one or more performance parameters that fall below a threshold value, etc. Exemplary performance parameters may include, but are not limited to, the signal strength of a radio link between the wireless terminal 100 and a base station 202, the signal quality of a radio link between the wireless terminal 100 and a base station 202, and the occurrence of a dropped call. SNR (Signal-to-Noise Ratio) may also be used, in accordance with common practice. Various types of changes in service quality may be detected, without limitation.

In response to measuring service quality, the wireless terminal determines its geographical location, if not already known (Block 320). For wireless terminals 100 having a Global Positioning System (GPS) receiver, geographical location is determined via the GPS receiver. For wireless terminals 100 not having a GPS receiver, geographical location can be approximated in various ways. For example, instead of a wireless terminal measuring distances to multiple GPS satellites and employing triangulation methods to determine location, distances to multiple base stations 202 and/or other signal sources can be measured by the wireless terminal 100, and then location can be similarly determined by the wireless terminal 100 via triangulation methods. As another example, geographical location can be approximated by determining the geographical location of the base station 202 with which the wireless terminal 101 has a radio link, generally because the base station 202 and wireless terminal 101 connected to it will be relatively close together. If multiple wireless terminals 100 measure the same service quality, the approximate locations of these wireless terminals 100 can be approximated via triangulation with one or more base stations 202 with which radio links are established, as would be understood by one skilled in the art to which the invention belongs.

Service quality information and location information are stored within the wireless terminal 100 for subsequent transmission to the central processor 204. Other information may be collected and stored, as well. For example, information about a user of a wireless terminal 100 and/or information about the wireless terminal 100 may be stored. Exemplary types of information include, but are not limited to, user identification, type of wireless terminal, identification number of the wireless terminal, various settings of the wireless terminal, etc.

According to some embodiments of the present invention, a wireless terminal 100 may be configured to collect user feedback about quality of service and/or about a detected problem (Block 340). For example, upon the detection of a problem, a wireless terminal 100 may ask the user several questions, for example, via the display of the wireless terminal 100. Exemplary questions include, but are not limited to, those listed below in Table 1:

TABLE 1

"On a 1 (insignificant) to 5 (worst) scale, how would you rate this problem?
Select rating."
"Is this problem sufficient to cause you to switch carriers? Select Yes or No."
"Is this problem minor or major for you? Select Minor or Major."
"Have you encountered this same problem before, and how many times? Select just this once, 1 to 3 times, 4 to 7 times, or more than 7 times."
"Is this an application you use frequently? Select Yes or No."
"Is this an important use instance of this application for you? Select Yes or No."

According to some embodiments of the present invention, a wireless terminal 100 may be configured to provide user access to a web log ("blog") to allow the user to provide feedback/concerns about a wireless service or other aspect of a wireless communications system to a wireless communications system service provider. According to some embodiments of the present invention a wireless terminal 100 may automatically connect a user to a blog and may automatically provide details to the blog about a detected problem, and then allow the user to provide comments. Other feedback techniques that may be utilized include such things as email, instant messaging and/or text messaging.

According to some embodiments of the present invention, a wireless terminal 100 may be configured to prompt a user to send a text message to a wireless communications system service provider. Exemplary prompts may include, but are not limited to, those listed below in Table 2:

TABLE 2

"Please enter a text message (75 characters or less) that you would like to associate with this problem. Rest assured, your input is appreciated and our engineers will review your input to help improve your service."
"Please enter a keyword or tag (15 characters or less) that you would like to associate with this problem. Or choose here from a list of pertinent keywords/tags."

According to some embodiments of the present invention, a wireless terminal 100 may be configured to prompt a user to select descriptive words from a "drop-down" list and send the selected words to a wireless communications system service provider. Exemplary descriptive words in a drop-down list may include, but are not limited to, those listed below in Table 3:

TABLE 3

"Please select a best qualifier from the list at right (containing 7 words)."
(e.g., "Disappointed," "inconvenienced," "peeved," "irritated," "disgusted," "angry," or "mad as hell.")

According to some embodiments of the present invention, users who provide feedback may be rewarded in various ways. For example a wireless communications system service provider may provide credits to a user's service bill in response to the user providing feedback regarding a service performance issue. As such, the central processor 204 may be configured to communicate with, for example, a billings and credits database 206 (or other similar business aspect of a wireless communications system that controls a user's account).

Still referring to FIG. 3, collected user feedback may be stored by a wireless terminal 100 for subsequent transmission to the central processor 204 (Block 350). Collected information including, performance parameter information, geographical location information, and user feedback is then transmitted to the central processor 204 (Block 360). Transmission to the central processor may occur according to a predetermined schedule (e.g., hourly, daily, etc.) and/or at times when traffic on the wireless communications system is low. Transmission may also occur based upon an interval since a previous transmission.

Figure 4:
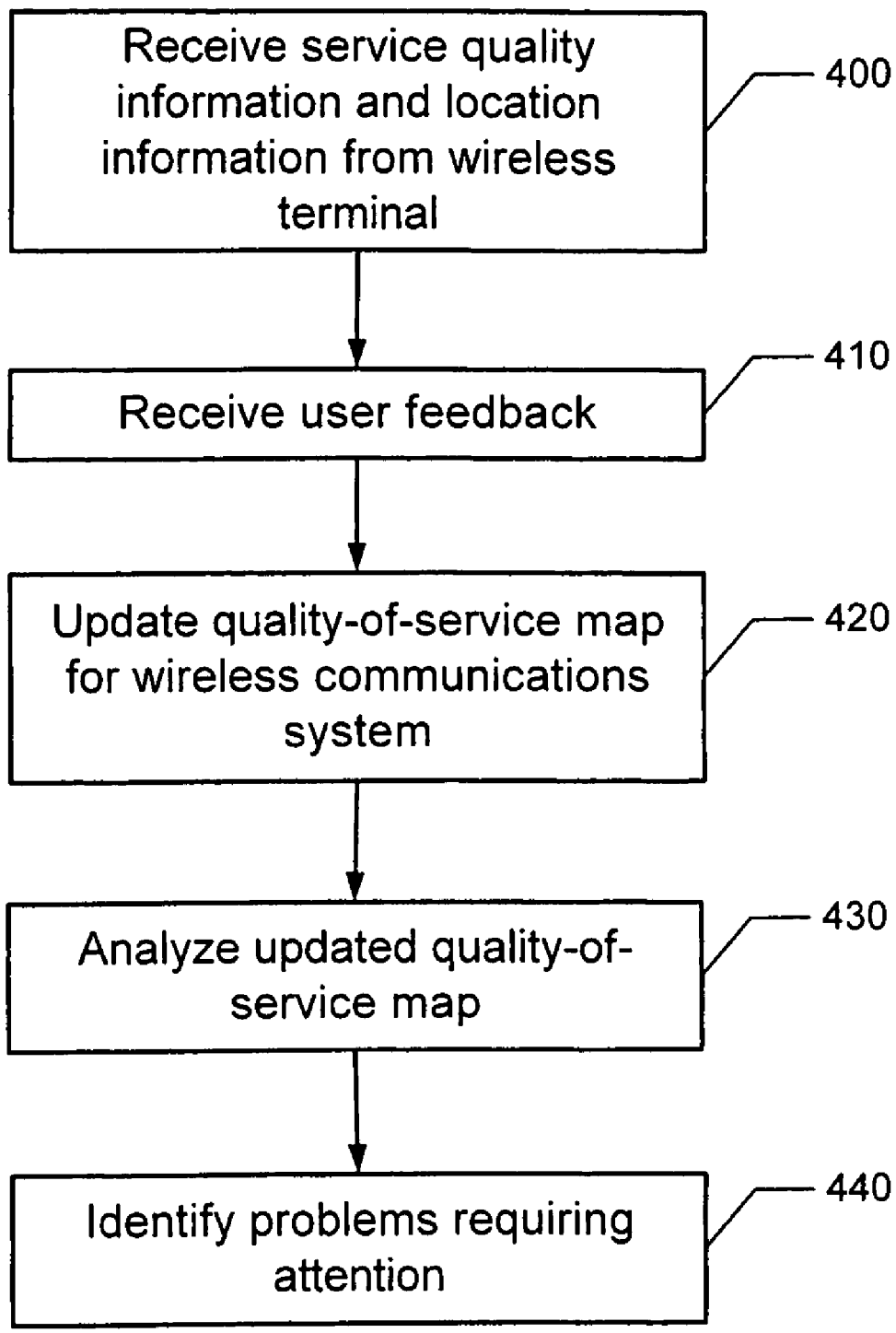
FIG. 4 is a flow chart that illustrates exemplary operations performed by a central processor, according to embodiments of the present invention.

Referring to FIG. 4 operations performed by a central processor 204 implementing embodiments of the present invention are illustrated. The operations of FIG. 4 are implemented via software (including firmware, resident software, micro-code, etc.) executing on a single processor or multiple processors that perform the various functions of central processor 204. Computer program code for carrying out the operations of FIG. 4 may be written in a high-level programming language, such as Java, AJAX (Asynchronous JavaScript), C, and/or C++, for development convenience. In addition, computer program code for carrying out operations of FIG. 4 may also be written in other programming languages, such as, but not limited to, interpreted languages. Some modules or routines may be written in assembly language or even micro-code to enhance performance and/or memory usage. However, embodiments of the present invention are not limited to a particular programming language. It will be further appreciated that the functionality of any or all of the operations in FIG. 4 may also be implemented using discrete hardware components, one or more application specific integrated circuits (ASICs), or a programmed digital signal processor or microcontroller.

It should be noted that in some embodiments of the present invention, the function(s) noted in the blocks of FIG. 4 may occur out of the illustrated order. For example, two blocks shown in succession may, in fact, be executed substantially concurrently or the blocks may sometimes be executed in the reverse order, depending on the functionality involved.

The central processor 204 receives information about quality of service and location information from one or more wireless terminals 100 (Block 400). The central processor 204 also receives user feedback regarding wireless service quality (including service problems) from one or more wireless terminals 100 (Block 410). Using received information, the central processor 204 updates one or more coverage maps and/or one or more quality-of-service maps for a wireless communications system (Block 420). In addition, updated coverage maps and/or quality-of-service maps are analyzed (Block 430) and problems requiring attention by a wireless service provider are identified (Block 440). According to some embodiments of the present invention, operations represented by Block 430 and 440 may be performed manually, for example, by wireless communications system engineers and/or technicians.

The automatic nature of detecting and reporting problems along with collecting user feedback, according to embodiments of the present invention, provide significant advantages over conventional ways of gathering data about wireless service problems. Moreover, embodiments of the present invention may help meet a key customer need for a reliable wireless network (and associated quality of experience), which can be important both to wireless users (for their satisfaction) and to wireless service providers (to avoid expensive customer turnover).

Embodiments of the present invention can be significantly more accurate, more effective, less costly, and/or more reliable than existing ways of detecting and rectifying problems in wireless communications systems. Embodiments of the present invention can eliminate the need for technicians to drive around a service area taking measurements. Moreover, unlike conventional service quality measurement techniques, which may not be able to reliably identify problems prior to user complaints, embodiments of the present invention can help resolve problems prior to user complaints. Moreover, the social network effect of the present invention can be fostered and cultivated so as to better understand user needs, so as to identify true dissatisfaction drivers.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed:

1. A method of monitoring quality-of-service performance of a wireless communications system, wherein the wireless communications system includes a plurality of base stations and wireless terminals, wherein each wireless terminal is configured to communicate via a radio link with a base station, the method comprising the following performed by a wireless terminal:

measuring quality-of-service performance of the wireless communication system on a periodic basis during use of the wireless terminal and when a user of the wireless terminal attempts to access, via the wireless terminal, a wireless communication service application selected from the group consisting of voice, video, image, text, instant messaging, multimedia messaging, video conferencing, gaming, Internet service, location-based services, and data delivery;

determining a geographical location of the wireless terminal in response to measuring the quality-of-service performance of the wireless communication system on the periodic basis and when the user attempts to access the wireless communication service application;

collecting user feedback regarding service quality, wherein the user feedback comprises text entered into the wireless terminal by the user; and storing quality-of-service performance information measured by the wireless terminal, location information, and collected user feedback for subsequent transmission to a central processor in the wireless communication system.

2. The method of claim 1, wherein the measurement of quality-of-service performance of the wireless service comprises at least one of a measurement of signal strength of a radio link with a base station and a measurement of signal quality of a radio link with a base station.

3. The method of claim 1, wherein determining a geographical location of the wireless terminal comprises determining a geographical location via a Global Positioning System receiver in the wireless terminal.

4. The method of claim 1, wherein determining a geographical location of the wireless terminal comprises determining a geographical location of a base station with which the wireless terminal has a radio link.

5. The method of claim 1, further comprising transmitting the stored quality-of-service performance information and location information to the central processor.

6. The method of claim 5, wherein the stored information is transmitted to the central processor according to a predetermined schedule.

7. The method of claim 1, wherein storing the quality-of-service performance information measured by the wireless terminal, location information, and collected user feedback further comprises storing additional information about at least one of the user and wireless terminal.

8. The method of claim 1, further comprising transmitting the stored user feedback, quality-of-service performance information, and location information to the central processor.

9. The method of claim 1, further comprising connecting the wireless terminal to a blog in response to measuring quality-of-service performance.

10. The method of claim 9, further comprising submitting information to the blog about the measured quality-of-service performance.

11. A non-transitory computer-readable medium encoded with instructions capable of being executed by a computer for performing a method of monitoring quality-of-service performance of a wireless communications system, the method comprising:

measuring quality-of-service performance of the wireless communication service on a periodic basis during use of the wireless terminal and when a user of the wireless terminal attempts to access, via the wireless terminal, a wireless communication service application selected from the group consisting of voice, video, image, text, instant messaging, multimedia messaging, video conferencing, gaming, Internet service, location-based services, and data delivery;

determining a geographical location of the wireless terminal in response to measuring quality-of-service performance of the wireless communication service on the periodic basis and when the user attempts to access the wireless communication service application;

collecting user feedback regarding service quality, wherein the user feedback comprises text entered into the wireless terminal by the user; and storing quality-of-service performance information measured by the wireless terminal, location information, and collected user feedback for subsequent transmission to a central processor in the wireless communication system.

12. The computer-readable medium of claim 11, further comprising instructions for transmitting stored quality-of-service performance information, location information, and collected user feedback to the central processor.

* * * * *